United States Patent
Choi et al.

(10) Patent No.: US 8,164,260 B2
(45) Date of Patent: Apr. 24, 2012

(54) DIELECTRIC COMPOSITION AND PLASMA DISPLAY PANEL INCLUDING THE SAME

(75) Inventors: Woong Choi, Cheongju-si (KR); Donghee Nam, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 12/594,421

(22) PCT Filed: Dec. 11, 2007

(86) PCT No.: PCT/KR2007/006441
§ 371 (c)(1),
(2), (4) Date: Oct. 2, 2009

(87) PCT Pub. No.: WO2008/120851
PCT Pub. Date: Oct. 9, 2008

(65) Prior Publication Data
US 2010/0079069 A1 Apr. 1, 2010

(30) Foreign Application Priority Data
Apr. 3, 2007 (KR) .......... 10-2007-0033015

(51) Int. Cl.
*H01J 17/49* (2006.01)
(52) U.S. Cl. .................. 313/586; 313/582
(58) Field of Classification Search .......... 313/582–587; 315/169.4; 345/34, 60, 65, 67, 68
See application file for complete search history.

(56) References Cited

U.S. PATENT DOCUMENTS

| 5,252,521 | A  | * | 10/1993 | Roberts ................. 501/17 |
| 5,753,571 | A  |   | 5/1998  | Donohue |
| 6,184,163 | B1 |   | 2/2001  | Lee et al. |
| 6,875,463 | B2 | * | 4/2005  | Mifune et al. ........... 427/64 |
| 2006/0231806 | A1 | * | 10/2006 | Barker et al. ............ 252/500 |
| 2008/0116803 | A1 | * | 5/2008  | Kawase et al. ........... 313/586 |

FOREIGN PATENT DOCUMENTS

| EP | 1 772 890 | 4/2007 |
| JP | 2002-160940 | 6/2002 |
| JP | 2004-284934 | 10/2004 |
| KR | 10-0266205 | 6/2000 |
| KR | 10-2007-0056544 | 6/2007 |
| KR | 10-2007-0064867 | 6/2007 |
| KR | 10-0755868 | 8/2007 |
| WO | WO 2006/073293 | 7/2006 |

OTHER PUBLICATIONS

International Search Report dated Mar. 10, 2008.
Korean Office Action dated Jan. 31, 2008.
Korean Office Action dated Jun. 11, 2008.
Korean Office Action dated Sep. 4, 2008.

* cited by examiner

*Primary Examiner* — Nimeshkumar Patel
*Assistant Examiner* — Christopher Raabe
(74) *Attorney, Agent, or Firm* — KED & Associates, LLP

(57) ABSTRACT

A dielectric composition for plasma display panel and a plasma display panel including the same are disclosed. The dielectric composition includes about 38 to 68 parts by weight of $Bi_2O_3$, about 10 to 35 parts by weight of $B_2O_3$, about 1 to 17 parts by weight of $SiO_2$, and about 1 to 15 parts by weight of $Al_2O_3$.

14 Claims, 1 Drawing Sheet

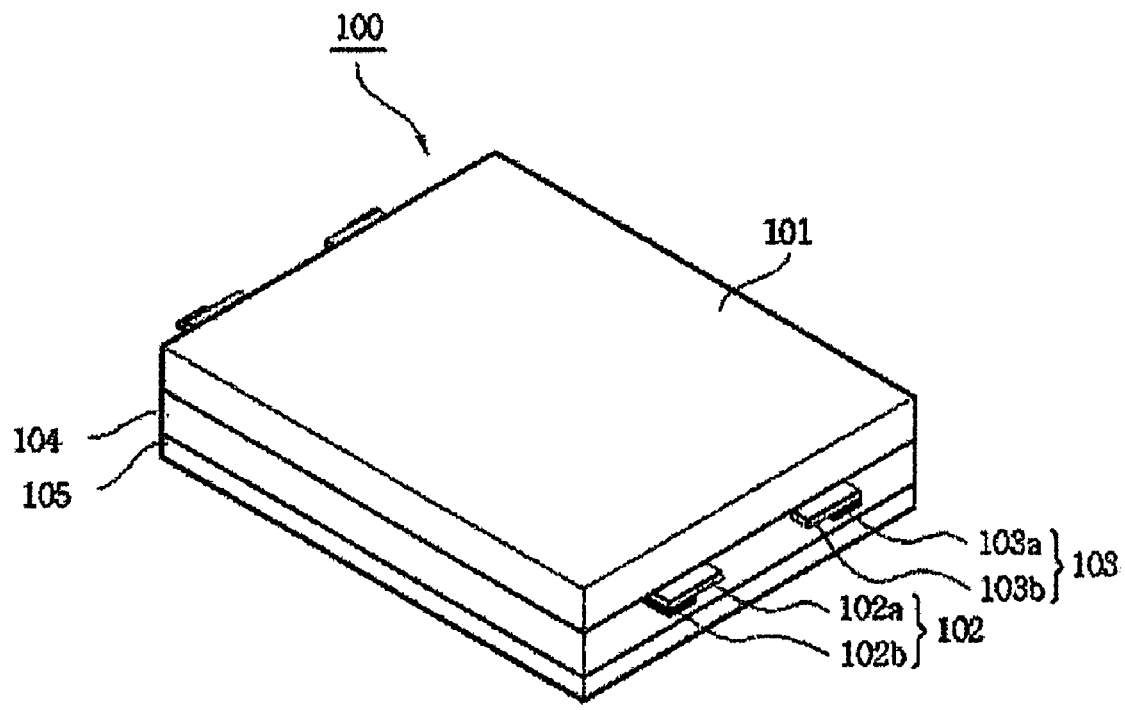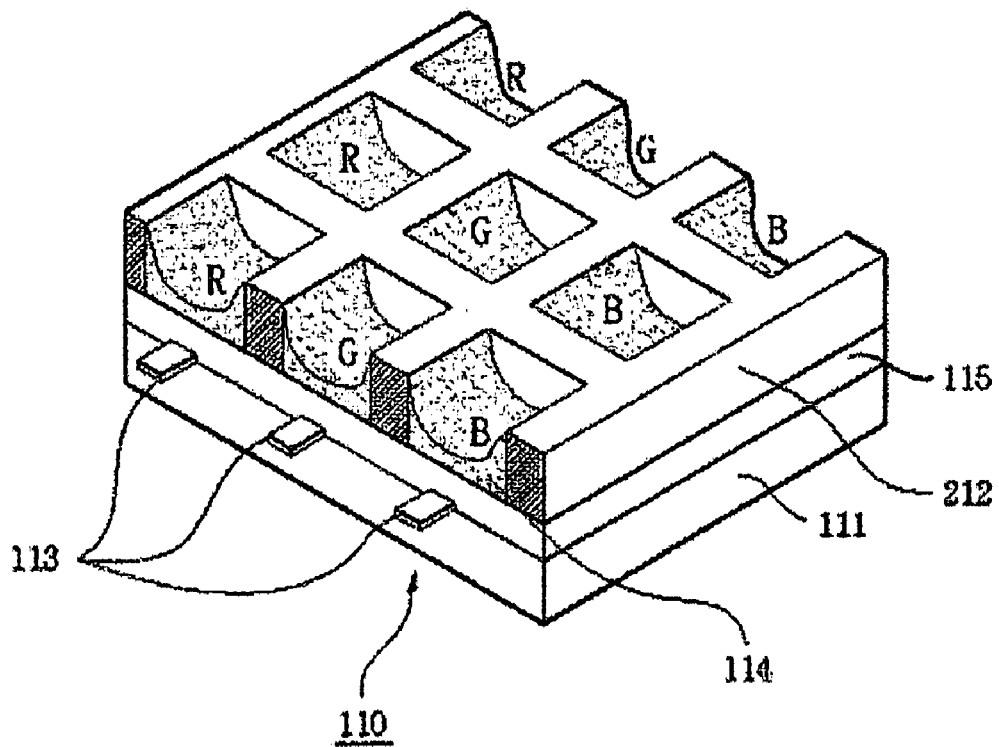

DIELECTRIC COMPOSITION AND PLASMA DISPLAY PANEL INCLUDING THE SAME

TECHNICAL FIELD

An exemplary embodiment of the present invention relates to a display apparatus, and more particularly, to a dielectric composition for plasma display panel and a plasma display panel including the same.

BACKGROUND ART

Out of display apparatuses, a plasma display apparatus generally includes a plasma display panel displaying an image and a driver for driving the plasma display panel.

The plasma display panel has the structure in which an upper dielectric layer and a lower dielectric layer respectively formed on a front substrate and a rear substrate and barrier ribs formed between the front substrate and the rear substrate form unit discharge cell or discharge cells. Each discharge cell is filled with an inert gas containing a main discharge gas such as neon (Ne), helium (He) or a mixture of Ne and He, and a small amount of xenon (Xe).

When the plasma display panel is discharged by a high frequency voltage, the inert gas generates vacuum ultraviolet rays, which thereby cause phosphors formed between the barrier ribs to emit light, thus displaying an image. Since the plasma display panel can be manufactured to be thin and large and also can provide the greatly improved image quality by the recently technological development, it has attracted attention as a next generation display device.

The upper dielectric layer and the lower dielectric layer limit a discharge current doing the generation of a plasma discharge, maintain a glow discharge, and perform a memory function for accumulating wall charges and a voltage reduction function. The dielectric layers may be formed by forming a dielectric formation material of a paste form obtained by mixing and kneading a powder such as a glass powder and an additive using a screen printing method and by firing it.

DISCLOSURE OF INVENTION

Technical Problem

A paste obtained by mixing a glass powder containing PbO with an organic material is mainly used to form the dielectric layer. However, it is known that PbO is harmful to the human body and the environment. Accordingly, an additional environment equipment is necessary to manufacture and use the glass powder, thereby redwing the process efficiency and increasing the manufacturing cost.

A glass composition containing a large amount of PbO has been used in the application of electronic parts over a long period of time. The glass composition containing PbO has been widely used in the electronic parts because of its high refraction index and low melting point. However, the use of PbO causing environmental problems has been on the rise as a problem which has to be urgently solved.

Technical Solution

An exemplary embodiment of the present invention provides an environmentally-friendly plasma display panel using a dielectric composition not including PbO.

A dielectric composition for a plasma display panel comprises about 38 to 68 parts by weight of $Bi_2O_3$, about 10 to 35 parts by weight of $B_2O_3$, about 1 to 17 parts by weight of $SiO_2$, and about 1 to 15 parts by weight of $Al_2O_3$.

The dielectric composition may further comprise at least one selected from the group consisting of BaO, CaO and ZnO.

A content of BaO may be more than 0 and equal to or less than 18 parts by weight, a content of CaO may be more than 0 and equal to or less than 5 parts by weight, and a content of ZnO may be more than 0 and equal to or less than 12 parts by weight.

The dielectric composition may further comprise at least one of NaO and $LiO_2$.

The total content of at least one of NaO and $LiO_2$ may be more than 0 and equal to or less than 5 parts by weight.

A plasma display panel comprises a front substrate, a rear substrate opposite to the front substrate, and a dielectric layer that is positioned on the rear substrate and is formed of a dielectric composition, the dielectric composition comprising about 38 to 68 parts by weight of $Bi_2O_3$, about 10 to 35 parts by weight of $B_2O_3$, about 1 to 17 parts by weight of $SiO_2$, and about 1 to 15 parts by weight of $Al_2O_3$.

The dielectric composition may further comprise at least one selected from the group consisting of BaO, CaO and ZnO.

A content of BaO may be more than 0 and equal to or less than 18 parts by weight, a content of CaO may be more than 0 and equal to or less than 5 parts by weight, and a content of ZnO may be more than 0 and equal to or less than 12 parts by weight.

The dielectric composition may further comprise at least one of NaO and $LiO_2$.

The total content of at least one of NaO and $LiO_2$ may be more than 0 and equal to or less than 5 parts by weight.

The dielectric layer may substantially have a glass softening temperature of 468 to 516° C.

The dielectric layer may substantially have an etching ratio equal to or less than 1.6 μm/min.

The dielectric layer may substantially have a glass transition temperature of 432 to 490° C.

Advantageous Effects

As described above, since the plasma display panel according to an exemplary embodiment includes the dielectric layer not including PbO, the environmentally-friendly plasma display panel having the similar characteristics to the dielectric layer including PbO can be provided.

BRIEF DESCRIPTION OF THE DRAWINGS

FIG. 1 illustrates a plasma display panel according to an exemplary embodiment of the present invention.

BEST MODE FOR CARRYING OUT THE INVENTION

FIG. 1 illustrates a plasma display panel according to an exemplary embodiment of the present invention.

As illustrated in FIG. 1, the plasma display panel includes a front panel 100 and a rear panel 110 which are positioned parallel to each other at a given distance therebetween. The front panel 100 includes a front substrate 101 on which a plurality of scan electrodes 102 and a plurality of sustain electrodes 103 are formed. The rear panel 110 includes a rear substrate 111 on which a plurality of address electrodes 113 are formed to intersect the scan electrodes 102 and the sustain electrodes 103.

The scan electrode 102 and the sustain electrode 103 generate a mutual discharge therebetween in one discharge cell and maintain light-emissions of discharge cells. More specifically, the scan electrode 102 and the sustain electrode 103 may each includes transparent electrodes 102a and 103a made of a transparent indium-tin-oxide (ITO) material and bus electrodes 102b and 103b made of an opaque metal material.

The scan electrode 102 and the sustain electrode 103 are covered with one or more upper dielectric layers 104 for limiting a discharge current and providing insulation between the scan electrode 102 and the sustain electrode 103. A protective layer 105 with a deposit of MgO may be positioned on the upper dielectric layer 104 to facilitate discharge conditions.

The rear panel 110 includes a plurality of stripe-type or well-type barrier ribs 112 for partitioning a plurality of discharge spaces (i.e., a plurality of discharge cells).

Red (R), green (G) and blue (B) phosphors 114 for emitting visible light for an image display during the generation of an address discharge are positioned inside the discharge cells partitioned by the barrier ribs 112.

A lower dielectric layer 115 is formed between the address electrodes 113 and the phosphors 114 to protect the address electrodes 113.

An exemplary embodiment of the present invention described the case where the upper dielectric layer 104 and the lower dielectric layer 115 are formed on the front substrate 101 and the rear substrate 111, respectively. However, an exemplary embodiment of the present invention is not limited thereto. On the contrary, the upper dielectric layer 104 and the lower dielectric layer 115 may be formed on the rear substrate 111 and the front substrate 101, respectively.

FIG. 1 illustrated only an example of the plasma display panel, and thus an exemplary embodiment of the present invention is not limited to the structure of the plasma display panel illustrated in FIG. 1. The plasma display panel illustrated in FIG. 1 includes the scan electrode 102, the sustain electrode 103 and the address electrode 113. However, at least one of the scan electrode 102, the sustain electrode 103 or the address electrode 113 may be omitted.

FIG. 1 illustrated the case where the barrier ribs 112 are formed on the rear substrate 111. However, the barrier ribs 112 may be formed on the front substrate 101, or on both the front substrate 101 and the rear substrate 111.

In the plasma display panel according to an exemplary embodiment of the present invention, the upper dielectric layer 104 and the lower dielectric layer 115 are formed on the front substrate 101 and the rear substrate 111, respectively, and the lower dielectric layer 115 does not include PbO and can be formed using various dielectric materials. In other words, the plasma display panel can be variously changed except the above-described conditions.

The dielectric composition for the plasma display panel according to an exemplary embodiment will be described below.

A dielectric composition for the plasma display panel according to an exemplary embodiment of the present invention maintains a glow discharge and accumulates wall charges. The dielectric composition does not include PbO, and is a lead-free glass composition including $Bi_2O_3$, $B_2O_3$, $SiO_2$ and $Al_2O_3$ as a principal component.

The dielectric composition for the plasma display panel includes $Bi_2O_3$, $B_2O_3$, $SiO_2$ and $Al_2O_3$, and may include at least one selected from the group consisting of ZnO, BaO and CaO. Further, the dielectric composition may include at least one of NaO and $LiO_2$ as an additive.

The dielectric composition may include about 38 to 68 parts by weight of $Bi_2O_3$. $Bi_2O_3$ lowers a melting temperature and a glass transition temperature of the dielectric composition.

When a content of $Bi_2O_3$ is equal to or more than 38 parts by weight, $Bi_2O_3$ can show an effect of a low melting point. When a content of $Bi_2O_3$ is equal to or less than 68 parts by weight, $Bi_2O_3$ can prevent a reversion of color of the glass to yellow.

The dielectric composition may include about 10 to 35 parts by weight of $B_2O_3$. $B_2O_3$ forms a network structure of the dielectric composition.

When a content of $B_2O_3$ is equal to or more than 10 parts by weight, the network structure of the dielectric composition can be fully formed. When a content of $B_2O_3$ is equal to or less than 35 parts by weight, $B_2O_3$ can prevent a rise in the glass transition temperature of the dielectric composition.

The dielectric composition may include about 1 to 17 parts by weight of $SiO_2$. $SiO_2$, which is a glass former, chemically and optically stabilizes a glass, and greatly raise a glass transition temperature and a glass softening temperature of the dielectric composition.

When a content of $SiO_2$ is equal to or more than 1 part by weight, $SiO_2$ can chemically and optically stabilize the dielectric composition. When a content of $SiO_2$ is equal to or less than 17 parts by weight, $SiO_2$ can prevent an excessive use in the glass transition temperature.

The dielectric composition may include about 1 to 15 parts by weight of $Al_2O_3$. $Al_2O_3$ reduces a thermal expansion coefficient of the dielectric composition and improve a ugh temperature viscosity of the dielectric composition, thereby improving mechanical and chemical stability of the dielectric composition.

When a content of $Al_2O_3$ is equal to or more than 1 part by weight, $Al_2O_3$ can reduce the thermal expansion coefficient and improve the mechanical and chemical stability. When a content of $Al_2O_3$ is equal to or less than 15 parts by weight, $Al_2O_3$ can reduce the thermal expansion coefficient and can be suitable for a viscosity behavior in a firing area.

The dielectric composition may further include BaO. A content of BaO may be more than 0 and equal to or less than 18 parts by weight. BaO adjusts a permittivity and a thermal expansion coefficient of the dielectric composition.

When a content of BaO is more than 0, the dielectric composition in which a permittivity and a thermal expansion coefficient are stabilized can be obtained. When a content of BaO is equal to or less than 18 parts by weight, BaO can prevent a reduction in the form stability of the dielectric composition caused by an increase in the thermal expansion coefficient.

The dielectric composition may further include CaO. A content of CaO may be more than 0 and equal to or less than 5 parts by weight. CaO is a glass modifier of a light color, slightly raise the glass transition temperature of the dielectric composition, and slightly reduces the thermal expansion coefficient of the dielectric composition.

When a content of CaO is more than 0, CaO can reduce the thermal expansion coefficient, thereby improving the form stability of the dielectric composition. When a content of CaO is equal to or less than 5 parts by weight, CaO can prevent an excessive reduction in the thermal expansion coefficient.

The dielectric composition may further include ZnO. A content of ZnO may be more than 0 and equal to or less than 12 parts by weight. ZnO lowers the glass transition temperature and the glass softening temperature of the dielectric composition.

When a content of ZnO is more than 0, ZnO can lower the glass transition temperature and the glass softening temperature. When a content of ZnO is equal to or less than 12 parts by weight, ZnO can prevent a glass crystallization which is likely to be formed by the dielectric composition.

The dielectric composition may further include an additive. Examples of the additive may include NaO and LiO2. The total content of at least one of NaO and LiO2 is more than 0 and equal to or less than 5 parts by weight. Both NaO and LiO2 are a glass modifier of yellow. NaO and LiO2 lower the glass transition temperature, thereby adjusting a firing temperature of the dielectric composition. NaO and LiO2 increase the permittivity and slightly increase the thermal expansion coefficient.

When the total content of at least one of NaO and LiO2 is more than 0, NaO and LiO2 can prevent a reduction in the permittivity. When the total content of at least one of NaO and LiO2 is equal to or less than 5 parts by weight, the dielectric composition can easily fired due to the proper glass transition temperature.

As above, the dielectric composition for the plasma display panel according to an exemplary embodiment includes Bi2O3, B2O3, SiO2 and Al2O3 as a principal component, and may further include BaO, CaO and ZnO. In addition to these components, the dielectric composition may further include at least one of NaO and LiO2 as an additive.

A method of manufacturing a dielectric powder using the dielectric composition for the plasma display panel will be described below.

The dielectric powder can be manufactured using general manufacturing processes of a glass powder. First, Bi2O3, B2O3, SiO2, Al2O3, BaO, CaO, ZnO, and at least one of NaO and LiO2 are provided in accordance with the above-described content, and are mixed with one another. Then, the mixture is melted at a temperature of 1000-1,500° C. for 10-60 minutes, and thus can uniformly mixed in a melting state.

The melted mixture is quickly frozen in a dry manner or a wet manner, and water may be used in the wet manner. Then, the quickly frozen mixture is ground in a dry manner or a wet manner. Water or an organic solvent may be used in the wet manner. Examples of the organic solvent include ethanol, methanol, ethyl acetate, toluene or isopropyl alcohol.

Water or the organic solvent may be used independently, and may be mixed with each other to form a dielectric powder. A gelation level of the dielectric powder and a color of the dielectric powder after firing the dielectric powder can be controlled depending on kinds of the organic solvent.

The ground dielectric powder is filtered, dried, and disintegrated to manufacture a powder having a small grain diameter, for instance, a diameter of 0.1-10 μm.

A method of manufacturing a dielectric paste using the dielectric powder thus manufactured will be described below.

A dielectric paste is coated on the rear substrate of the plasma display panel as high as 10-15 μm.

The dielectric paste is formed by mixing the dielectric powder, a binder and an organic solvent. The dielectric powder, as described above, is obtained by mixing, melting, quickly freezing, filtering, drying and disintegrating the dielectric composition including about 38 to 68 parts by weight of Bi2O3, about 10 to 35 parts by weight of B2O3, about 1 to 17 parts by weight of SiO2, about 1 to 15 parts by weight of Al2O3, BaO more than 0 and equal to or less than 18 parts by weight, CaO more than 0 and equal to or less than 5 parts by weight, ZnO more than 0 and equal to or less than 12 parts by weight, and at least one of NaO and LiO2 whose the total content is more than 0 and equal to or less than 5 parts by weight.

A general tinder used to manufacture the dielectric layer may be used as the tinder. For instance, at least one polymer resin of acrylic-based resin, epoxy-based resin, or ethyl cellulose-based resin may be used.

A general organic solvent used to manufacture the dielectric layer may be used as the organic solvent. For instance, at least one of butyl cellosolve (BC), butyl carbitol acetate (BCA), terpineol (TP) or texanol may be used.

In addition, a filler may be further added to the dielectric paste. For instance, CrO, CuO, MgO, Al2O3, ZnO, TiO2, 3Al2O3SiO2 may be used.

MODE FOR THE INVENTION

Experimental Example 1

Bi2O3 of 68 g, B2O3 of 10 g, SiO2 of 7 g and Al2O3 of 15 g were mixed with one another, and the mixture was melted in a furnace at 1200° C. The melted mixture was quickly dry-frozen, and then ground to form a dielectric powder.

The dielectric powder of 94 g, ethyl cellulose of 3 g and butyl carbitol acetate (BCA) of 3 g were mixed to manufacture a dielectric paste.

The dielectric paste was coated on a rear substrate, on which an address electrode is formed, as high as 10-15 μm, and then dried.

The dried dielectric paste was fired at 500° C. to form a dielectric layer.

Experimental Example 2

A dielectric layer of the experimental example 2 was manufactured under the same condition as the above experimental example 1, except a dielectric composition forming a dielectric powder. The dielectric composition included Bi2O3 of 59.4 g, B2O3 of 17.3 g, SiO2 of 8.6 g, Al2O3 of 1.62 g, BaO of 3.2 g, CaO of 2.2 g, and ZnO of 7.6.

Experimental Example 3

A dielectric layer of the experimental example 3 was manufactured under the same condition as the above experimental example 1, except a dielectric composition forming a dielectric powder. The dielectric composition included Bi2O3 of 53 g, B2O3 of 16 g, SiO2 of 7.5 g, Al2O3 of 6.5 g, BaO of 2 g, and ZnO of 2.5 g.

Experimental Example 4

A dielectric layer of the experimental example 4 was manufactured under the same condition as the above experimental example 1, except a dielectric composition forming a dielectric powder. The dielectric composition included Bi2O3 of 53 g, B2O3 of 7 g, SiO2 of 4 g, Al2O3 of 17 g, BaO of 3.5 g, CaO of 1.5 g, and ZnO of 14 g.

Experimental Example 5

A dielectric layer of the experimental example 5 was manufactured under the same condition as the above experimental example 1, except a dielectric composition forming a dielectric powder. The dielectric composition included Bi2O3 of 51 g, B2O3 of 9 g, SiO2 of 3 g, Al2O3 of 16 g, BaO of 3 g, CaO of 4 g, and ZnO of 14 g.

Experimental Example 6

A dielectric layer of the experimental example 6 was manufactured under the same condition as the above experimental example 1, except a dielectric composition forming a dielectric powder. The dielectric composition included Bi2O3 of 516 g, B2O3 of 25 g, SiO2 of 10 g, Al2O3 of 8.9 g, BaO of 1 g, and CaO of 2.5 g.

Experimental Example 7

A dielectric layer of the experimental example 7 was manufactured under the same condition as the above experimental example 1, except a dielectric composition forming a dielectric powder. The dielectric composition included Bi2O3 of 48.73 g, B2O3 of 28.94 g, SiO2 of 13.15 g, and Al2O3 of 9.19 g.

Experimental Example 8

A dielectric layer of the experimental example 8 was manufactured under the same condition as the above experimental example 1, except a dielectric composition forming a dielectric powder. The dielectric composition included Bi2O3 of 48.73 g, B2O3 of 18.94 g, SiO2 of 9.19 g, Al2O3 of 13.15 g, and ZnO of 10 g.

Comparative Example

A dielectric layer of the comparative example was manufactured using a marketing mother glass including PbO under the same condition as the above experimental example 1.

A glass transition temperature, a glass softening temperature and an etching ratio of each of the dielectric layers of the experimental examples 1 to 8 and the comparative example were measured and indicated in the following table 1.

TABLE 1

|  | Glass transition temperature (° C.) | Glass softening temperature (° C.) | Etching ratio (μm/min) |
| --- | --- | --- | --- |
| Experimental example 1 | 432 | 468 | 0.2 |
| Experimental example 2 | 490 | 516 | 0.5 |
| Experimental example 3 | 441 | 489 | 1.6 |
| Experimental example 4 | 445 | 493 | 1 |
| Experimental example 5 | 467 | 499 | 1.3 |
| Experimental example 6 | 474 | 502 | 1.2 |
| Experimental example 7 | 469 | 510 | 1.4 |
| Experimental example 8 | 448 | 495 | 1.5 |
| Comparative example | 445 | 480 | 1 |

As indicated in the above table 1, the dielectric layer of the plasma display panel according to an exemplary embodiment in the experimental examples 1 to 8 had a glass transition temperature of 432-490° C., a glass softening temperature of 468-516° C., and an etching ratio of 0.2-1.6 μm/min.

Accordingly, the dielectric layers of the experimental examples 1 to 8 had a similar thermal characteristic (i.e., the glass transition temperature and the glass softening temperature) and a similar etching characteristic (i.e., the etching ratio) to the dielectric layer of the comparative example including PbO.

The invention claimed is:

1. A dielectric composition for a dielectric layer that provides electrical isolation and insulation in a plasma display panel, the dielectric composition comprising:
    about 38 to 68 parts by weight of $Bi_2O_3$;
    about 10 to 35 parts by weight of $B_2O_3$;
    about 1 to 17 parts by weight of $SiO_2$;
    about 1 to 15 parts by weight of $Al_2O_3$; and
    at least one of NaO or $LiO_2$, wherein a total content of the at least one of NaO or $LiO_2$ is greater than 0 and less than or equal to 5 parts by weight.

2. The dielectric composition of claim 1, further comprising at least one selected from the group consisting of BaO, CaO and ZnO.

3. The dielectric composition of claim 2, wherein a content of BaO is more than 0 and equal to or less than 18 parts by weight, a content of CaO is more than 0 and equal to or less than 5 parts by weight, and a content of ZnO is more than 0 and equal to or less than 12 parts by weight.

4. A plasma display panel comprising:
    a front substrate;
    a rear substrate opposite to the front substrate; and
    a dielectric layer that is positioned on the rear substrate and provides electrical isolation and insulation, wherein the dielectric layer is formed of a dielectric composition, the dielectric composition comprising:
        about 38 to 68 parts by weight of $Bi_2O_3$;
        about 10 to 35 parts by weight of $B_2O_3$;
        about 1 to 17 parts by weight of $SiO_2$; and
        about 1 to 15 parts by weight of $Al_2O_3$; and
        at least one of NaO or $LiO_2$, wherein a total content of the at least one of NaO or $LiO_2$ is greater than 0 and less than or equal to 5 parts by weight.

5. The plasma display panel of claim 4, the dielectric composition further comprises at least one selected from the group consisting of BaO, CaO and ZnO.

6. The plasma display panel of claim 5, wherein a content of BaO is more than 0 and equal to or less than 18 parts by weight, a content of CaO is more than 0 and equal to or less than 5 parts by weight, and a content of ZnO is more than 0 and equal to or less than 12 parts by weight.

7. The plasma display panel of claim 4, wherein the dielectric layer substantially has a glass softening temperature of 468 to 516° C.

8. The plasma display panel of claim 4, wherein the dielectric layer substantially has an etching ratio equal to or less than 1.6 μm/min.

9. The plasma display panel of claim 4, wherein the dielectric layer substantially has a glass transition temperature of 432 to 490° C.

10. The dielectric composition of claim 1, wherein the dielectric composition is a lead-free composition.

11. The dielectric composition of claim 1, wherein the dielectric composition comprises greater than 21 and less than or equal to 35 parts by weight of $B_2O_3$, and greater than 5 and less than or equal to 15 parts by weight of $Al_2O_3$.

12. The plasma display panel of claim 4, wherein the dielectric composition is a lead-free composition.

13. The plasma display panel of claim 4, wherein the dielectric composition comprises greater than 21 and less than or equal to 35 parts by weight of $B_2O_3$, and greater than 5 and less than or equal to 15 parts by weight of $Al_2O_3$.

14. The plasma display panel of claim 4, further comprising a protective layer contacting the dielectric layer.

* * * * *